INVENTORS:
NORMAN SZEREMY,
PETER A. LASKY,

BY Norman C. Fulmer
THEIR ATTORNEY.

INVENTORS:
NORMAN SZEREMY,
PETER A. LASKY,
BY Norman C. Fulmer
THEIR ATTORNEY.

3,132,281

BLANKING CIRCUITS FOR TELEVISION RECEIVERS INCLUDING A BLANKING WINDING

Norman Szeremy, Syracuse, and Peter A. Lasky, North Syracuse, N.Y., assignors to General Electric Company, a corporation of New York Filed Feb. 29, 1960, Ser. No. 11,541
4 Claims. (Cl. 315—22)

Figure 1:
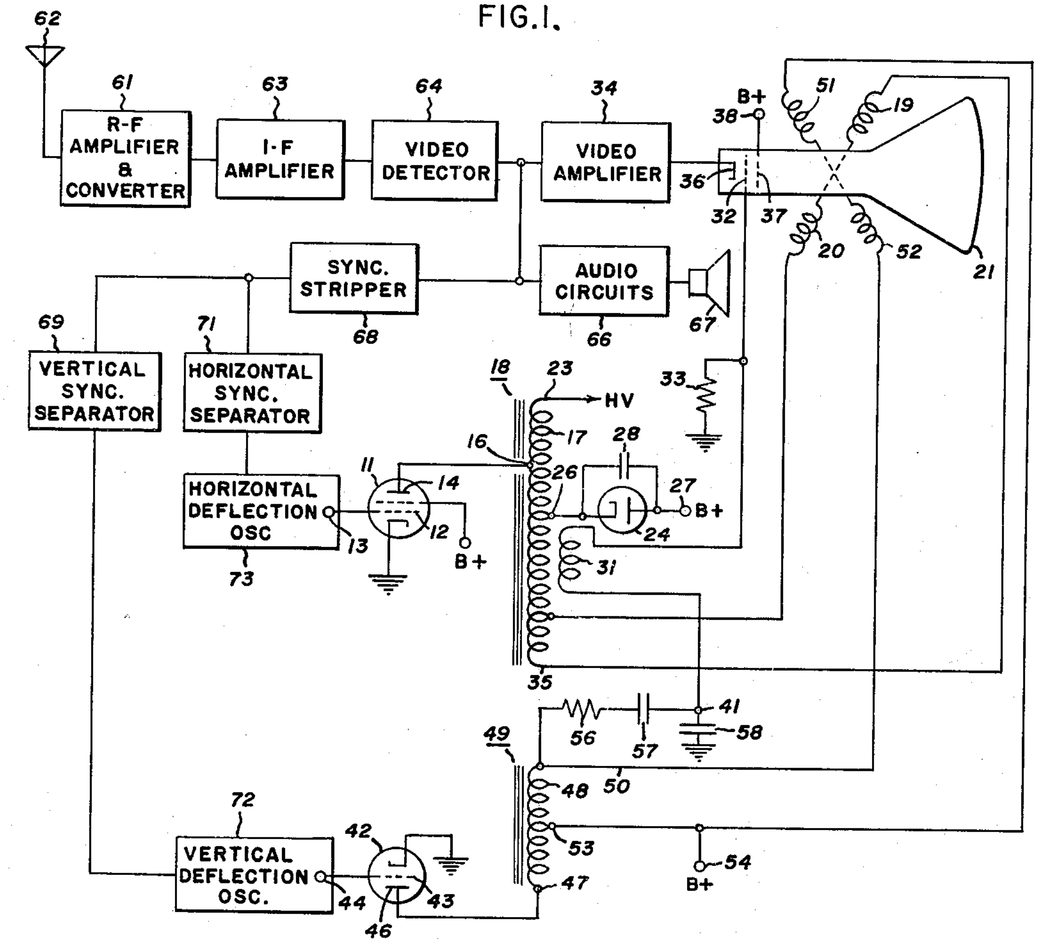

This invention relates to television receivers, and particularly to blanking circuits used therein.

Blanking circuits are employed to turn off, or "blank" the electron beam of a television receiver during retract periods thereof. If blanking is not employed, undesirable retrace lines will appear on the viewing screen.

Various circuit arrangements have been used in the past for achieving blanking, and efforts have been made to develop arrangements for providing effective blanking without adding unduly to the cost of a television receiver. It is desirable to provide blanking during both the vertical and horizontal retrace periods of the electron beam scanning. This requires two periodic blanking signals; a vertical blanking signal and a horizontal blanking signal, these blanking signals being applied to control electrodes of the television picture tube. A suitable vertical blanking signal can readily be obtained, and at small cost, from the vertical deflection output transformer that is customarily employed in television receivers.

Heretofore, however, there has not been known any practical and low-cost manner in which to obtain a suitable horizontal blanking signal, nor has there been known a practical and low-cost manner for applying both horizontal and vertical blanking signals to the control electrodes of the picture tube. For these reasons, many television receivers, especially those selling at relatively low prices, have not been provided with horizontal blanking.

A horizontal blanking signal has not heretofore been obtainable from the horizontal deflection transformer in a simple manner as in the case with obtaining the vertical blanking signal from the vertical deflection transformer, because the signal in the winding of the horizontal deflection transformer contains certain large-amplitude high-frequency components due to a periodic cut off condition of the horizontal deflection amplifier output tube. The vertical deflection amplifier output tube, on the other hand, is not periodically cut off, and hence the signal in the vertical deflection output transformer does not contain the aforesaid large-amplitude high-frequency components.

Previous, and costly, attempts to provide a horizontal blanking signal have included a circuit comprising an individual blanking winding inductively coupled to the winding of the horizontal deflection output transformer of the television receiver so as to produce a pulse signal that is applied to the cathode or control grid of the picture tube so as to blank or turn off the electron beam during the horizontal retrace portion of the deflection cycle. In such an arrangement, there is a tendency for a periodic oscillation to be set up in the blanking winding due to shock excitation of the winding by the large-amplitude high-frequency components of the horizontal fly-back pulses. This periodic oscillation tends to cause undesirable striations to appear on the face of the picture tube in the form of vertical stripes. To obviate this effect, extra circuitry is required, such as the use of an extra damper tube connected to the blanking winding so as to damp out these oscillations; however, such an expedient is costly.

Heretofore, there has not been known a practical and low-cost manner of applying both vertical and horizontal blanking signals to the control electrodes of a television picture tube. Television picture tubes have two control electrodes for controlling intensity of the electron beam: a cathode and a control grid. Although picture tubes also contain a first anode which can effect some control of electron beam intensity, this electrode is relatively insensitive and would require an unduly large magnitude of control signal. The video signal is applied to either the cathode or the control grid of the picture tube, leaving only one control electrode free to which blanking signals can be applied. It is undesirable to apply a blanking signal to the same electrode to which the video signal is applied, because to do so results in an impedance loading of the video circuit thereby causing degradation of the frequency response of the video signal. Thus, as a practical matter, only one electrode of the picture tube is available for the application of blanking signals. When both of the vertical and horizontal blanking circuits are connected to the same electrode of the picture tube, each blanking circuit loads the other, or, if the blanking circuits have different output impedances, the lower-impedance circuit acts as a load on the higher-impedance circuit. Such loading is undesirable, as it causes distortion and loss of amplitude of one or both of the blanking signals, and hence special coupling circuits must be used to reduce the loading.

As has already been pointed out, the aforesaid difficulties and expense of providing a horizontal blanking signal, and of applying both vertical and horizontal blanking signals to control elements of a picture tube, have resulted in many television sets being designed without any horizontal blanking, and in such sets the horizontal retrace lines will appear to an extent that will reduce the picture contrast and will cause uneven brightness over the face of the picture tube.

An object of the present invention is to provide a new horizontal blanking circuit that is simple, effective, and economical to manufacture.

Another object is to provide a new horizontal blanking circuit connected with a vertical blanking circuit for producing a combined vertical and horizontal blanking signal. Further objects will be apparent from the following disclosure and claims.

The invention is most readily applicable to a commonly used type of television receiver circuit wherein the horizontal deflection circuit employs an output transformer having a horizontal output winding to which the horizontal sweep signal is applied. This winding is connected to a pair of horizontal deflection coils associated with the picture tube. A high-voltage rectifier, for producing a high voltage to be applied to an electrode of the picture tube, usually is connected to the horizontal output winding, and this winding also is provided with a tap to which the "B+" operating direct voltage is applied through a damping diode.

The invention comprises an individual horizontal blanking winding positioned on the horizontal output transformer and closely coupled to that portion of the winding thereof which is the most strongly damped. This portion of relatively high damping of the horizontal output winding will generally be in the vicinity of the tap to which the customary horizontal damping diode is connected. The invention further comprises a series connection of the above-described horizontal blanking winding to a source of vertical blanking signal, this series connection providing a combined horizontal and vertical blanking signal that may be applied to either the cathode or control grid of the picture tube. The invention provides the aforesaid series connection in such a manner that a minimum of blocking capacitors need be employed for blocking the direct voltages of the television receiver from the combined horizontal and vertical blanking signals.

Figure 2:
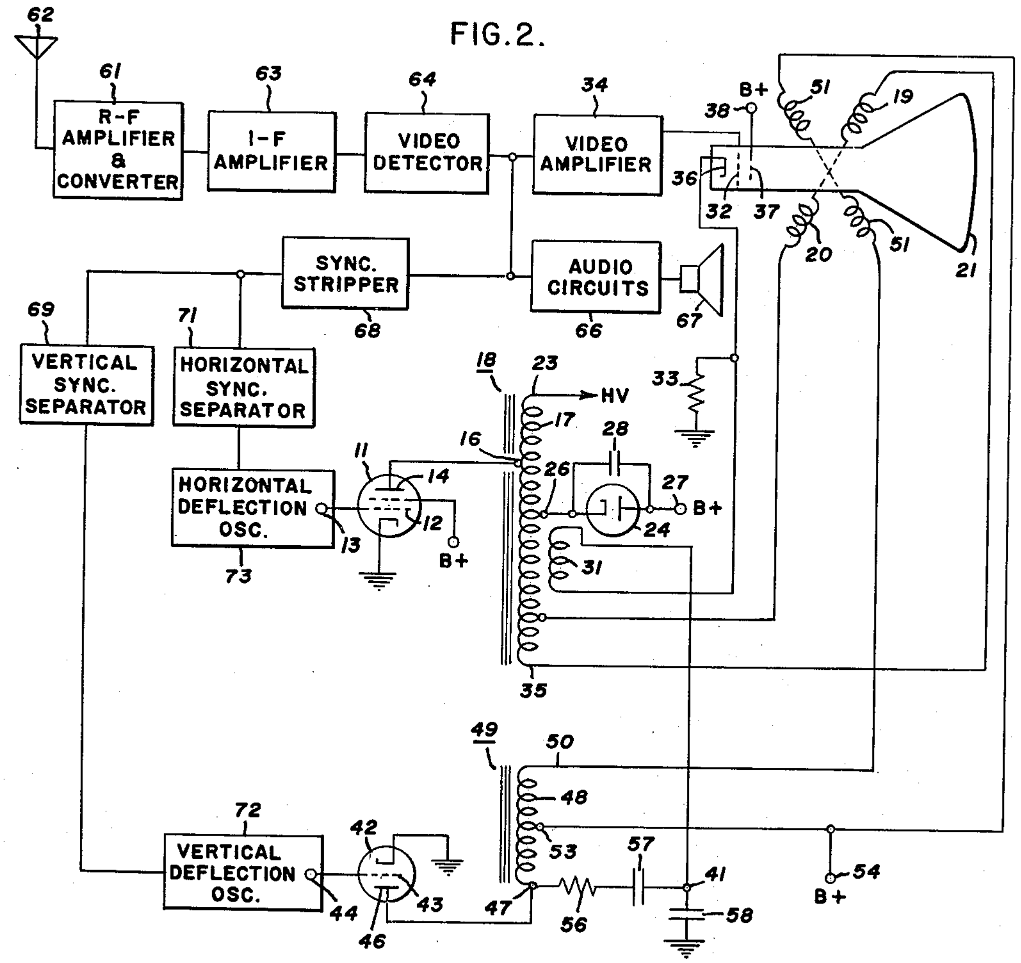
Figure 3:
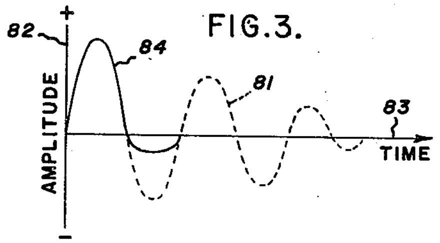

In the drawing, FIGURE 1 is a schematic electrical diagram of a preferred embodiment of the invention wherein the combined horizontal and vertical blanking signals are applied to the control grid of a television picture tube, FIGURE 2 is a schematic electrical diagram of an alternative embodiment of the invention wherein the combined horizontal and vertical blanking signals are applied to the cathode of a television picture tube, and FIGURE 3 is a graphic representation of undesired oscillations which the invention substantially eliminates.

In FIGURE 1, the horizontal output amplifier stage of a television receiver is represented by a tube 11 having a control electrode 12 to which a horizontal sweep signal is applied by way of a terminal 13. The output electrode 14 of the amplifier 11 is connected to a tap 16 on the winding 17 of a horizontal deflection output transformer 18. A pair of horizontal deflection coils 19, 20, which are associated with a picture tube 21 in conventional manner, are connected across a portion of the horizontal output winding 17 near the lower end 35 thereof. The remaining end 23 of the winding 17 may be connected to a rectifier system, not shown, for the purpose of providing a suitable high voltage for the anode of the picture tube 21, in a well-known manner.

A damper diode 24 is connected between a tap 26 on the horizontal output winding 17 and a terminal 27 of positive potential "B+" operating voltage, the anode thereof being connected to the terminal 27. A capacitor 28 is connected across the elements of the diode 24. The horizontal deflection output circuit described thus far is conventional and well known.

A horizontal blanking winding 31 is coupled to the horizontal output winding 17. As will be pointed out in more detail hereinafter, the blanking winding 31 is arranged to be tightly coupled inductively to a region of the winding 17 that is relatively highly damped, this highly damped region generally being in the vicinity of the tap 26 to which the horizontal damping diode 24 is connected. One end of the horizontal blanking winding 31 is connected to the control grid 32 of the picture tube 21. A resistor 33 is connected between this control grid 32 and electrical ground in order to provide quiescent bias for the control grid 32. A video amplifier 34 is connected to the cathode 36 of the picture tube 21. A first anode 37 of the tube 21 is connected to a terminal 38 of positive direct potential, in the conventional manner.

The remaining end of the horizontal blanking winding 31 is connected to a point 41 of the vertical output deflection system. The vertical deflection system may comprise an amplifier tube 42 having a control electrode 43 connected to a terminal 44 to which a vertical sweep signal is applied. An output electrode 46 of the vertical amplifier tube 42 is connected to an end 47 of the winding 48 of a vertical output transformer 49, a pair of vertical deflection coils 51, 52 being connected in series across a portion of the vertical output winding 48. Preferably, the vertical deflection coils 51, 52 are connected between a tap 53 on the winding 48 and the remaining end 50 of this winding. The tap 53 is connected to a terminal 54 to which a suitable positive potential operating voltage is applied. A resistor 56 and capacitor 57 are connected in series between the end 50 of the vertical output winding 48 and the point 41. A capacitor 58 is connected between the point 41 and electrical ground. To form a complete television receiver, other circuits, which are conventional, comprises a radio-frequency amplifier and converter circuit 61 having an input connected to antenna 62 and having an output connected to the input of an intermediate frequency amplifier 63. The output of the amplifier 63 is connected to the input of a video detector 64, the output of which is connected to the input of the video amplifier 34 and also to audio circuits 66 which drive a loudspeaker 67. The output of the video detector 64 also is connected, via a synchronization signal stripper 68, to a vertical synchronization signal separator 69 and a horizontal synchronization signal separator 71. The output of the vertical synchronization signal separator 69 is connected to the input of a vertical deflection oscillator 72, the output of which is connected to the terminal 44. The output of the horizontal synchronization signal separator 71 is connected to the input of a horizontal deflection oscillator 73, the output of which is connected to the terminal 13. Further circuits, such as automatic gain control circuits, are frequently employed but are not shown on the drawing and are not necessary for understanding the present invention.

The circuit of FIGURE 1 functions as follows. The horizontal output circuit, with the exception of the blanking winding 31, functions in a conventional manner, i.e. the output electrode of the horizontal amplifier tube 11 receives its operating voltage from the terminal 27, via the damper diode 24 and via the portion of the horizontal output winding between the taps 16 and 26 thereof, whereby in response to the horizontal deflection voltage that is applied to the terminal 13, a periodic pulsating signal is generated in the winding 17. Due to periodic cutoff conditions of the amplifier tube 11 in response the input signal thereof, the signal in the winding 17 contains periodic "fly back" voltage pulses of relatively large magnitude, which are useful for generating a high voltage at the end 23 of the winding 17.

The damper diode 24 functions to insure a proper wave shape in the horizontal deflection winding 19, 20, and performs other functions not necessary to the understanding of the present invention, such as the generation of B+ boost voltage across the capacitor 28.

If the horizontal blanking winding 31 is positioned where expedient, such as near the lower end 35 of the winding 17 as in previously suggested arrangements, the pulsating voltage induced therein by the pulsating signal in the winding 17 tends to produce undesired oscillations in the blanking winding 31. More specifically, a train of shock-excited oscillations occur in the blanking winding 31 upon each occurrence of the flyback pulse in the winding 17. One of these undesired trains of oscillations is represented by the dotted line 81 in FIGURE 3. In FIGURE 3, the vertical axis 82 represents amplitude and the horizontal axis 83 represents time.

In accordance with the present invention, the horizontal blanking winding 31 is located at a certain critical position with respect to the winding 17, this position being at the most highly damped region of winding 17, this region being in the vicinity of the tap 26. We have found that when the blanking winding 31 is located at this position, the periodic trains of oscillations 81 as shown in FIGURE 3 are substantially damped out after only one-half cycle thereof, as indicated by the solid line 84, this half-cycle pulse 84 being the desired horizontal blanking pulse. Preferably, the blanking winding 31 is positioned closely around, or within, the winding 17 at the region of the tap 26 thereof. The beneficial damping of the undesired oscillations 81 is believed to be caused, at least in part, by the action of the damper diode 24. Thus, in accordance with the invention, another useful function is added to the functions performed by the diode 24.

The vertical sweep output circuitry shown in FIGURE 1, and the functioning thereof, is conventional. The vertical sweep signal is applied to the terminal 44, and this signal is amplified by the tube 42 and applied to the vertical output winding 48 and is then applied to the vertical deflection coils 51, 52. The resistor 56 functions as an isolation resistor, the capacitor 57 functions to differentiate the vertical output signal, and the capacitor 58 functions to integrate this differentiated signal. More specifically, the capacitor 57 passes only the higher frequency components of the vertical output signal, and the capacitor 58 broadens the width of these higher frequency components. The combined effect of the resistor 56, and capacitors 57 and 58, is to produce a vertical blanking pulse of suitable shape and magnitude at the point 41. Since the horizontal blanking winding 31 is connected in series between this point 41 of vertical blanking signal and the control grid 32 of the picture tube 21, combined horizontal and vertical blanking signals are applied to the control grid 32. This series connection of the horizontal blanking winding 31 eliminates the need for any additional blocking capacitors to prevent direct voltage from being combined with the blanking signals, since the capacitors 57 and 58 are already necessary in the vertical blanking circuit and these capacitors function as blocking capacitors for both the vertical and horizontal blanking signals as well as functioning to differentiate and integrate the vertical deflection signal.

As mentioned above, the horizontal blanking winding 31 should be tightly coupled to the horizontal output winding 17 at the region thereof that is most highly damped. Thus, there is produced in the winding 31 a suitable horizontal blanking pulse that is substantially unaccompanied by undesired shock-excited oscillations which have been found to appear in previously attempted arrangements making use of a horizontal blanking winding. The amplitude of the blanking pulses produced in the winding 31 is controlled by the number of turns of the winding 31, and this amplitude is preferably established at a level that will cancel the television synchronizing pulses that are applied to the cathode 36 by the video amplifier 34 and which invariably are distorted or "spiked" due to inherent differentiations in the video amplifier 34. The blanking pulses produced in the winding 31, if of suitable amplitude, will also cancel the effects of horizontal retrace lines caused by an inevitable coupling of the flyback pulses to the wiring of the first anode 37 of the picture tube 21.

In FIGURE 2, the circuit elements are given the same numerals as the corresponding circuit elements in FIGURE 1. The circuit of FIGURE 2 differs from that of FIGURE 1 in that the combined horizontal and vertical blanking signals are applied to the cathode 36 rather than to the control grid 32 of the picture tube 21. The connections of the winding 31 are reversed from that shown in FIGURE 1, and the point 41 and the elements 56, 57 and 58, are connected to the end 47 of the vertical output winding 48 instead of to the end 50 thereof. The arrangement of FIGURE 2 functions the same as that of FIGURE 1, the blanking signals being reversed from that of FIGURE 1, and the polarity of the output signal of the video amplifier 34 being reversed from that of FIGURE 1 for reasons well understood by those skilled in the art.

It will be appreciated that the invention provides an effective and relatively simple and economical television blanking circuit, wherein a horizontal blanking winding 31 is positioned in a new and critical manner with respect to the horizontal output winding 17 so as to produce suitable periodical horizontal oscillations that have plagued prior art attempts to employ a horizontal blanking winding. Furthermore, the novel series connection of the horizontal blanking winding 31 with the vertical blanking circuitry at a point 41 intermediate a differentiating capacitor 57 and an integrating capacitor 58, provides combined horizontal and vertical blanking signals without the need for adding any additional blocking capacitors. The combined signals can conveniently be applied to a control electrode of the picture tube. It will also be appreciated that the horizontal blanking signal may be provided independently of the vertical blanking signal, if desired, by removing the end of the horizontal blanking winding 31 from the point 41, and connecting it to electrical ground either directly or via a capacitor.

While preferred embodiments and modifications of the invention have been shown and described, various other embodiments and modifications thereof will be apparent to those skilled in the art, and will fall within the scope of the invention as defined in the following claims.

What we claim is:

1. In a television receiver provided with a horizontal deflection and blanking circuit having a transformer winding, a source of operating voltage including a reference potential, a deflection signal source, means coupling said deflection signal source to a preselected first position on said transformer winding, means coupling said deflection signal source to said reference potential, a diode having first and second electrodes, means connecting said first electrode to said source of operating voltage, and means connecting said second electrode to a preselected second position on said transformer winding, the improvement comprising a blanking winding tightly coupled inductively to said transformer winding at the region thereof in the vicinity of said second position thereby to produce in said blanking winding a blanking signal that is substantially free from undesired oscillations a cathode ray tube having a cathode, a control grid and first anode, means for applying video signals to said cathode, a direct current connection from one end of said blanking winding to said control grid, and means providing an alternating current ground at the other end of said blanking winding.

2. A horizontal blanking circuit comprising a cathode ray tube having a cathode and a control grid, means for applying video signals to said cathode, a horizontal deflection system having a deflection transformer, a blanking winding coupled to a highly damped portion of said deflection transformer so as to produce thereacross a horizontal blanking pulse in which ringing is substantially reduced, a bilateral direct current connection between one end of said blanking winding and said control grid, and means providing an alternating current ground at the other end of said blanking winding.

3. A horizontal blanking circuit comprising a cathode ray tube having a cathode and a control grid, means for applying video signals to said cathode, a horizontal deflection system having a deflection transformer, a blanking winding coupled to a highly damped portion of said deflection transformer so as to produce thereacross a horizontal blanking pulse in which ringing is substantially reduced, a bilateral direct current connection between one end of said blanking winding and said control grid, a vertical deflection system, means for deriving a vertical blanking pulse across a low impedance, one side of said low impedance being connected to ground, and means for coupling the other side of said low impedance to the other end of said blanking winding.

4. A horizontal blanking circuit comprising a cathode ray tube having a cathode and a control grid, means for applying video signals to said cathode, a horizontal deflection system having a deflection transformer, a blanking winding coupled to a highly damped portion of said deflection transformer so as to produce thereacross a horizontal blanking pulse in which ringing is substantially reduced, a bilateral direct current connection between one end of said blanking winding and said control grid, a vertical deflection system including a deflection transformer, first and second capacitor connected in series between one end of said latter deflection transformer and ground, a direct current connection between the junction of said first and second capacitor and the other end of said horizontal blanking winding, and a resistor connected between said control grid and ground.

References Cited in the file of this patent

UNITED STATES PATENTS 2,560,815 Oliver ---------------- July 17, 1951

OTHER REFERENCES

Rider Television Manual, vol. 7. Rider Publisher, Inc., New York, 1951, General Electric TV, pages 7—8, 7—9.